(12) United States Patent
Arning et al.

(10) Patent No.: US 7,386,593 B2
(45) Date of Patent: Jun. 10, 2008

(54) HANDLING OF MESSAGES IN A ELECTRONIC MESSAGING SYSTEM

(75) Inventors: Andreas Arning, Tuebingen (DE);
Dieter Roller, Schoenaich (DE);
Andreas Maier, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 890 days.

(21) Appl. No.: 10/698,137

(22) Filed: Oct. 30, 2003

(65) Prior Publication Data

US 2004/0114735 A1 Jun. 17, 2004

(30) Foreign Application Priority Data

Dec. 11, 2002 (DE) .................................. 02102724

(51) Int. Cl.
*G06F 15/16* (2006.01)
(52) U.S. Cl. ...................... 709/206; 709/202; 709/224; 709/235; 707/10; 707/200
(58) Field of Classification Search ................ 709/202, 709/224, 235, 239, 240, 242; 707/10, 200
See application file for complete search history.

(56) References Cited

U.S. PATENT DOCUMENTS

| | | | | |
|---|---|---|---|---|
| 5,794,039 | A * | 8/1998 | Guck ....................... | 707/103 R |
| 5,999,932 | A * | 12/1999 | Paul ............................ | 707/10 |
| 6,052,709 | A * | 4/2000 | Paul ............................ | 709/202 |
| 6,779,021 | B1 * | 8/2004 | Bates et al. .................. | 709/206 |
| 7,136,920 | B2 * | 11/2006 | Castell et al. ............... | 709/224 |
| 2002/0120689 | A1 * | 8/2002 | Kang et al. .................. | 709/206 |
| 2002/0138581 | A1 * | 9/2002 | MacIntosh et al. .......... | 709/206 |
| 2002/0188689 | A1 * | 12/2002 | Michael ....................... | 709/206 |
| 2003/0069900 | A1 * | 4/2003 | Hind et al. .................. | 707/200 |
| 2003/0177190 | A1 * | 9/2003 | Moody et al. .............. | 709/206 |
| 2004/0054733 | A1 * | 3/2004 | Weeks ......................... | 709/206 |

FOREIGN PATENT DOCUMENTS

| | | |
|---|---|---|
| TW | 505859 | 10/2002 |
| TW | 509852 | 11/2002 |
| TW | 511014 | 11/2002 |

* cited by examiner

*Primary Examiner*—John Follansbee
*Assistant Examiner*—Backhean Tiv
(74) *Attorney, Agent, or Firm*—Duke W. Yee; Matthew W. Boca; Theodore D. Fay, III

(57) ABSTRACT

The present invention proposes a computerized method and means for providing an improved handling of messages directed to an user of an electronic messaging system.

The suggested method comprises a first step of determining user characteristics capable of identifying the user as an addressee of a message.

The method further comprises a second step of analyzing a certain message and determining its message characteristics exploiting the information contained in one or a multitude of message fields.

The method finally comprises a third step of applying at least one deduction rule of a potential set of deduction rules to said certain message. The deduction rule assigns based on the user characteristics and the message characteristics a role of said user to said certain message. The role is capable of revealing said user's relationship to said certain message.

11 Claims, 2 Drawing Sheets

HANDLING OF MESSAGES IN A ELECTRONIC MESSAGING SYSTEM

1. BACKGROUND OF THE INVENTION

1.1. Field of the Invention

The present invention relates generally to collaborative document systems like message control systems, and more particularly to electronic mail control systems.

1.2. Description and Disadvantages of Prior Art

Collaborative document systems represent a well established technology allowing to share electronic documents within a community of a large number of distributed users using their interconnected workstations for access to these collaborative document systems. A common feature of this technology is that the electronic documents to a certain extent obey a predefined structure of interrelated data fields. Typically the particular data fields making up an electronic document can be freely defined; examples for instance are: project name, subject, author, list of team members representing the primary editors, additional editors and the like. Type and number of these data fields typically depend on the particular purpose the electronic documents are used for.

A particular example of such collaborative document systems are the digital communication systems, called messaging systems. One specialized variant of these systems are of the "electronic message" or "electronic mail" type, which often are simply called email systems. In such systems, several or even a very large number of work stations are interconnected by a system which allows users at the work stations to send messages to each other. Such messages are the electronic equivalent of letters and memoranda.

In a typical messaging system there will normally be a standard format defined for such messages (or, often, a number of slightly different formats for different purposes). The format will normally have several fields, including a sender field, a date field, an addressee field (the TO: field), and a message body field; in addition, there will often be further fields, including in particular a "copy-to" field (the CC: field) and a "subject" field. The addressee and copy-to fields will often each be capable of holding more than one identifier, so that a message can be sent to several addressees and copied to several more. The "addressee" and "copy-to" fields are normally functionally equivalent as far as the system is concerned, with the distinction between the two being of significance only to the users.

In a typical prior art system, when a user generates a message, the system will automatically transmit it to the addressees (including the copy-to's). At each of the stations to which it is sent, it will be stored in a folder (which may well be termed the "in-tray" folder). When the users at that station choose to manually inspect the contents of the in-tray, they will extract the various messages from it one after another, inspect each, and take whatever action they think appropriate, such as deleting the message, printing it out, or storing it in some other folder.

In practice, it is found that such a procedure can become burdensome, because the number of messages which accumulates in the in-tray can become so large that a considerable amount of time and effort is required for the user to work through the accumulation of messages in the in-tray. Because the usage of such systems nowadays is so widespread and their handling has become quite simple the number of messages the typical user is receiving every day may be quite large; one may even expect that this number will increase further.

To cope with these increasing numbers of messages various technologies have been suggested within prior art.

Certain collaborative document systems, like for instance Lotus Notes, allow a sender to attach some type of sender specific priority to a certain message. The "Urgent" flag within Lotus Notes allows a sender to mark messages with the following levels of urgency: "Urgent", "Normal", "Just for information". A serious disadvantage of such approaches is that this priority expresses only the author's (e.g. sender's) perception of urgency rather than the reader's individual perception of urgency, not to talk about a sender who willfully "oversells" the importance of his message. In particular if the document is targeted for several users, this mechanism cannot work.

Other prior art approaches consist in establishing filters which automatically filter out documents based on attributes occurring within a message (like for instance author, subject, size). This is an approach typically taken to filter out spam messages, i.e. messages advertising for some product sent to a mailing list or newsgroup.

Other teachings, like for instance U.S. Pat. No. 5,377,354, provide technology for prioritizing a plurality of incoming electronic mail messages for a user by applying user created rules, which are stored in a rules-store, to said user's messages. After execution of these rules priority numbers are assigned to the messages which permit to sort said user's list of messages in accordance to this computed priority number.

To improve the handling of these rules the teaching of W. W. Cohen in "W. W. Cohen, W. W. 1996a. Learning rules that classify e-mail. In Papers from the AAAI Spring Symposium on Machine Learning in Information Access, 18-25" discloses to dynamically create such rules based on a proposed learning process.

Despite of all of these advances further progress is still required as users of such collaborative systems, especially messaging systems, are not satisfied with the current state of the art.

1.2 Objective of the Invention

The invention is based on the objective to improve the handling of messages directed to an user of an electronic messaging system.

2. SUMMARY AND ADVANTAGES OF THE INVENTION

The objectives of the invention are solved by the independent claims. Further advantageous arrangements and embodiments of the invention are set forth in the respective subclaims.

The present invention proposes a computerized method and means for providing an improved handling of messages directed to an user of an electronic messaging system.

The suggested method comprises a first step of determining user characteristics capable of identifying the user as an addressee of a message.

The method further comprises a second step of analyzing a certain message and determining its message characteristics exploiting the information contained in one or a multitude of message fields.

The method finally comprises a third step of applying at least one deduction rule of a potential set of deduction rules to said certain message. The deduction rule assigns based on the user characteristics and the message characteristics a role of said user to said certain message. The role is capable of revealing said user's relationship to said certain message.

According to a fundamental observation of the current invention the recipient's role with respect to a certain message identifying the user's relationship to the particular message is a most important element to decide how to handle that message. Knowing the user's role with respect to a certain message the user can decide, in most cases without knowing the details of the message contents (i.e. without having read and having understood the message), how and when to deal with that particular message.

Being able to derive a recipient's role with respect to a certain message automatically saves a lot of working time for the recipient. Users of messaging systems report that they have to spend a lot of their time only for the purpose to understand how to deal with a certain message and how to handle it. Providing the recipient's role according to the current invention makes it in many cases unnecessary to spend time consuming inspection steps for deciding how to handle that message; i.e. as a result a recipient has to read a particular message only once. Thus the proposed technology supports a user to much more selectively work with a multitude of messages.

It is a further fundamental observation of the current invention that the recipient's role with respect to a certain message most clearly expresses the sender's expectation how that recipient has to handle a message (from the sender's perspective). It is the recipient's role which easily allows to decide for example whether a recipient is required to take notice of that message only (representing a "for your information only" message), whether a recipient is expected to open a message and read it carefully, whether a recipient is expected to perform some actions described within the message or whether a recipient is expected to reply with a further message back to the sender.

The teaching of the current invention is orthogonal to other prior art approaches for the same problem, i.e. it enhances the current technology in a new direction such that it may be combined with other known technologies, like for instance prioritization approaches, filtering approaches and the like. This provides the important advantage of synergistic improvements.

The suggested approach has the further advantage that no message documents are filtered away, thus no data has been lost. A user is never losing control and the user can identify at a glance based on the role assigned to each message those messages where an action is required and thus someone else may depend on. This can be done without doing manual scanning of each document; instead, the individual role is computed automatically.

3. BRIEF DESCRIPTION OF THE DRAWINGS

4. DESCRIPTION OF THE PREFERRED EMBODIMENT

Figure 1:
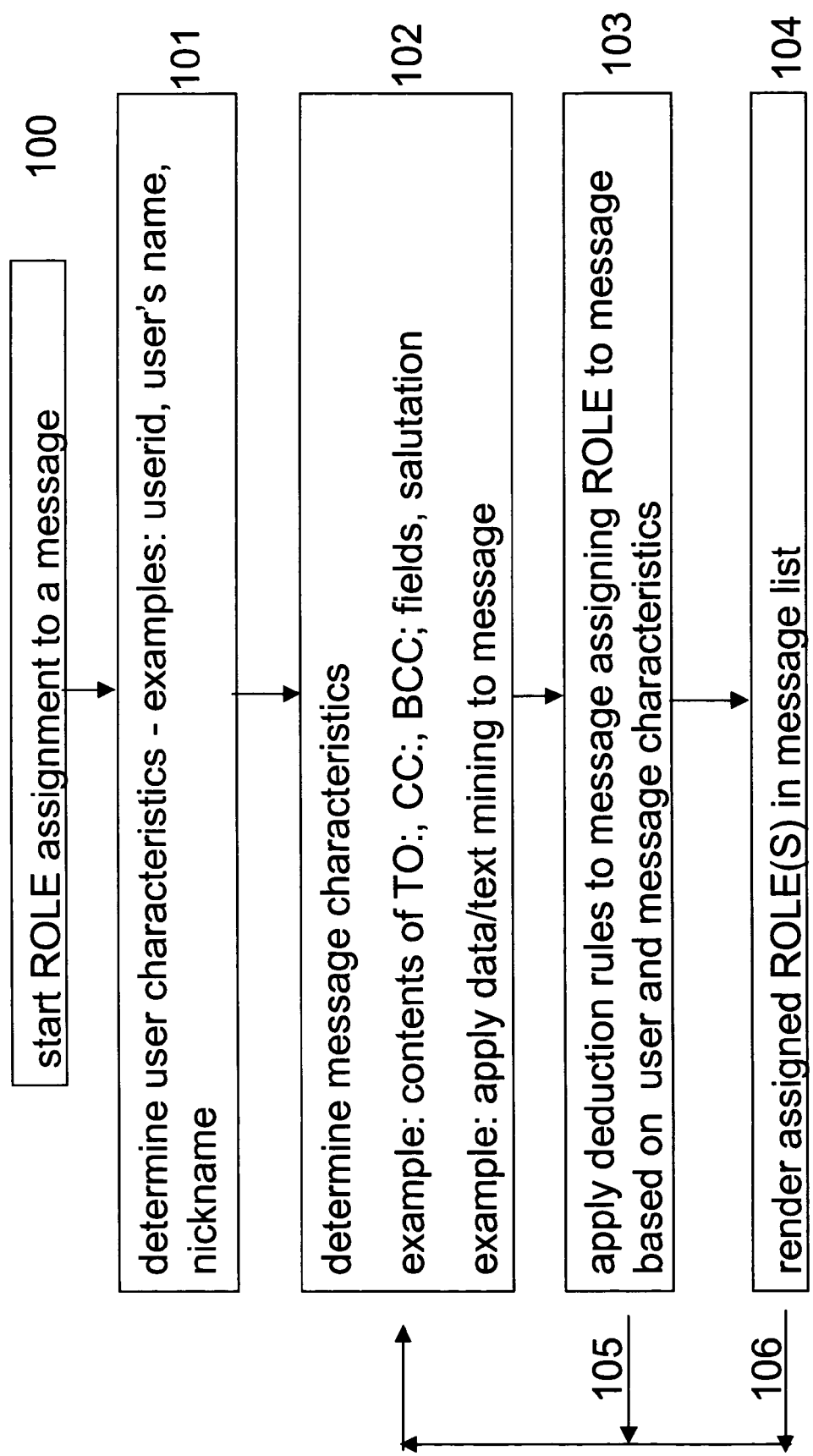
FIG. 1 represents a summarizing overview on the method as proposed by the current invention.

In the drawings and specification there has been set forth a preferred embodiment of the invention and, although specific terms are used, the description thus given uses terminology in a generic and descriptive sense only and not for purposes of limitation. It will, however, be evident that various modifications and changes may be made thereto without departing from the broader spirit and scope of the invention as set forth in the appended claims.

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which—when being loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The current invention is illustrated to some extent based on the commercially available collaborative document system "Lotus Notes". Of course the current teaching applies also to any other type of system, which offers comparable collaborative document functionalities in general or messaging capabilities in specific. Even if the described embodiment of the current invention focuses on messaging systems the current teaching may be applied to all collaborative document systems as well.

4.1 Introduction

A message to be sent from a sender to one or more recipients comprises several parts also called message fields. Preferably and specifically, the following fields, which can be exploited by the current invention, can be identified:

A Sender Field

The sender field contains the identity of the sender, i.e. a string representing the (worldwide unique) userid of the author. This identity is a unique identifier used by the messaging system. Depending on the specific design of the system, the identifier may be chosen in a form which also has a mnemonic significance, or the system may include conversion tables which convert the identifier to a human-recognizable name.

A Date Field

An Addressee Field—the TO: Field

This contains the identities of the addressees to whom the message is being sent, in the form of identifiers like the sender identifier. There can be more than one addressee. This field even may contain a symbolic distribution list. The field represents the primary addressee(s) of the mail. In messaging systems this field even may be empty in case the fields CC: or BCC: described below are filled in.

A Copy-to Field—the CC: Field

This field contains one or more strings, each one representing either an addressee or a symbolic distribution list (comprising a multitude of addressees). This field represents the secondary addressee(s) of the message to whom a complimentary copy of that message will be sent.

A Further Copy-to Field—the BCC: Field

This field contains one or more strings, each one representing either an addressee or a symbolic distribution list (comprising a multitude of addressees). This field represents the secret secondary addressee(s) of the message to whom a complimentary copy of that message will be sent. No other addressees are aware of secret secondary addressees, not the addressees on the TO: and CC: fields and also no other secret secondary addressees—giving this field its name: "Blind Carbon Copy".

A Subject Field

This will contain a short heading identifying, to the addressees, the subject matter of the message.

An Urgency Indicator

This field carries optional information that the sender expresses especially high (or sometimes especially low) "urgency". It defines the priority of the message according to the view of the sender.

A Body Field

This will contain the main text of the message, and will be of highly varied length; it represents the actual payload, i.e. the text transported from the sender to the addressees.

A Greeting Field, also Called Salutation Field

This field is optional and contains the greeting, e.g. for instance the first name(s) or nickname(s) on a separate line. In many implementations (e.g. Lotus Notes) this field does not exist as a separate message field, but any greetings are stored in the body field (see above) instead.

A Closing Field, also Called a Footer

This field may contain a closing phrase (e.g. for instance "Best regards") followed by a short footer or stamp containing things like a phone number or address or other information for describing the sender like business entity the sender is working for.

A typical scenario a user of messaging systems is confronted with might be the following. The messaging system proposes to the user a list of messages (e.g. the set of incoming messages) addressed to him/her. Usually an overview panel lists a one-line description for each message; this line might comprise the sender of the message, the sending date, the size of the message and may be also a subject line, defining the subject as viewed by the sender. Especially if the number of these messages is quite large a user's problem is to handle the multitude of messages in a most time-efficient way.

For some of the messages a swift response by the recipient is required, for other messages only a careful read is necessary while other messages could remain unopened allowing the user to come back to it if required at a future point in time. Based on the information made available by the current state of the art messaging systems the user has almost no other chance for deciding how to handle a particular message than to read into each of the messages to understand the particular situation and then to decide how to handle it. This type of scanning activity needs some time, which may add up to significant amounts of time per user and year.

Current state of the art solution approaches allowing a user to deal with this problem are the following:

1. The reader (e.g. message recipient) does a short read for each message to perceive the detailed situation addressed by that message and to determine how to handle this message from his/her particular perspective for instance to determine the appropriate priority that message has to be handled with. However, this short reading must be done with high priority in order to avoid missing messages that require an action with high priority. Thus as disadvantage of this approach a significant amount of time has to be spent for this scanning activity.
2. As an alternative approach the recipient is just guessing without starting to read the message how to handle it by only looking at the overview panel described above. The user's guess maybe based on information presented in this panel for instance on the sender, subject, size or date of the message. The clear disadvantage of this approach is that the guess may be wrong.
3. Prioritizing each message with a priority indication measuring the individual importance of each message maybe a further approach. A sender of a message marks his messages with different levels of urgency, like for instance "Urgent", "Normal", "Just for information". optionally also numeric values may be associated with the messages. In case the priority is assigned by the sender a serious disadvantage is that this expresses only the author's (e.g. sender's) perception of urgency rather than the reader's individual perception of urgency. In particular, if the document is targeted to several users, this mechanism cannot work. In case the priority is determined on the recipient side by some automatic mechanism this additional information might help to determine the sequence according to which the individual messages have to be inspected, but it does not eliminate the need to inspect the messages for deciding how to handling these.
4. Moreover filtering options for messages can be established so that a user can automatically filter out messages documents by attributes (e.g. author, subject, size). Such an approach introduced the risk that nevertheless important messages will be deleted. Moreover there still remains a large number of other messages for which no solution approach is available.

4.2 Basic Solution Concept

As known solutions approaches might improve the problem situation but nevertheless remain unsatisfactory the current invention is targeting at an orthogonal direction compared to prior art approaches based on the following observations:

1. According to a fundamental observation of the current invention the recipient's role with respect to a certain message identifying the user's relationship to the particular message is a most important element to decide how to handle that message. Knowing the user's role with respect to a certain message the user can decide, in most cases without knowing the details of the message contents (i.e. without having read and having understood the message), how and when to deal with that particular message.
2. It is a further fundamental observation of the current invention that the recipient's role with respect to a certain message most clearly expresses the sender's expectation how that recipient has to handle the message (from the sender's perspective). It is the recipient's role which easily allows to decide for example whether a recipient is required to take notice of that message only (representing a "for your information only" message), whether a recipient is expected to open a message and read it carefully, whether a recipient is expected to perform some actions described within the message or whether a recipient is expected to reply with an further message back to the sender.

Based on these observations the following overall methodology is suggested for improving the handling of messages directed to an user of an electronic messaging system:

1. In a first step user characteristics capable of identifying the particular user as addressee of a message are determined.

The particular user is that user who logged into the messaging system with a unique (personal) identity key (e.g. userid and password). From this identity key the user specific attributes, called the user characteristics, may be determined. These user characteristics may comprise one or several of the following elements:

said user's userid in said messaging system U;
said user's full or partial name N;
said user's nickname NN;
etc.

These user characteristics turn out to be quite successful, of course other user characteristics may be used instead.

2. In a second step a certain message is analyzed and its message characteristics from one or a multitude of message fields are determined.

As message characteristics all attributes of a message, even the message contents or attributes derived from the message, can be exploited. In many messaging systems messages belong to one or a multitude of different message/document types that have certain formats with well-defined semantics assigned to the format elements (e.g. Lotus Notes mail documents). From this perspective all of the above mentioned message fields can be exploited to determine a message's characteristics. Especially the following message fields turned out to be very valuable, wherein said message characteristics comprise one or a multitude of the following elements:

the contents of the TO: field;
the contents of the CC: field, identifying addressees receiving a complimentary copy;
the contents of the BCC: field, identifying addressee(s) receiving a blind carbon copy (for privacy reasons a BBC: recipient would typically see no other BCC: addressees, but generally it depends on the particular messaging system how these aspects are handled);
the contents of the body of said message.

3. In a third step one or a multitude of deduction rules of a set of deduction rules is applied to a particular message, which assigns based on the determined user characteristics and the determined message characteristics a role of that user to said message. The role reveals that user's relationship to that particular message.

According to the observations mentioned above for each of these messages the expectations to the user (the recipient) may differ with the role he/she has in this message mail (e.g. user should respond, or user should just take notice of the content without response). Thus the role is reflecting the expectations of a sender with respect to the addressee; automatically determining the addressee's role is most helpful to understand these expectations without having to inspect the particular message. Some of the expectations make the processing of a message/document time critical, since they imply that others wait (e.g for a response), while other expectations are not time critical, since no other individuals wait for an immediate reaction. Each message document may be made available to several users, where different users may have different roles for the same document.

The following automatically determined roles turned out to be very helpful:

a role of SINGLE-ADDRESSEE, indicating if a user is the only addressee in the TO: field;
a role of MULTIPLE-ADDRESSEES, indicating if a user is one of a multitude of addressees in the TO: field;
a role of SINGLE-CC-ADDRESSEE, indicating if a user is the only addressee in the CC: field;
a role of MULTIPLE-CC-ADDRESSEES, indicating if a user is one of a multitude of addressees in the CC: field;
a role of BCC-ADDRESSEE, indicating if a user is an addressee in the BCC: field;
a role of DISTRIBUTION-LIST, indicating if a user is a member of a distribution list in the TO: field.

When discussing the deduction rules in more detail further below the current specification will return to the roles once more. Of course above mentioned roles represent examples only, depending on the specific application area other roles can be used instead.

4. In a fourth step the role assigned to the message is indicated visually in the user's message list (comprising those message(s) a role has been assigned to as well as other messages directed to the user).

It is suggested that this indication is anyone or combination of the following:

an icon uniquely indicating said role;
a textual indication of said role (for instance above mentioned roles names; SINGLE-ADDRESSEE, etc.).

The computer system renders the message to the user, according to the user's role wrt. to this message. Preferably, the role for each message is already shown in the overview panel that displays a set of messages at a glance (e.g. one-line text or one icon per document). The role can be encoded as icon, or expressed by any other attribute (e.g. using font, size, color, bold, italics, underline attributes, blinking).

Alternately, the role may only rendered implicitly by sorting/arranging the messages in the overview page in an appropriate order (e.g. the messages where the reader has to act/respond displayed first). Optionally, the rendering can be done in the already opened document as well; even though it would be best to save the user opening of the document at all for finding out the role, even a small improvement to prior art would be to assist the user in determining his/her role faster. This can be done e.g. by highlighting any occurrence of the user's name and/or userid when displaying the content of the document; for example in an message document, it will speed up the "manual" scanning when the user's name is highlighted inside a list of other user's names. In addition, the computer system can do a simplification of the found strings (e.g. in a messaging system, it may strip redundant trailers like "/Germany/IBM@IBMDE" from all userids that have the same trailer as the current user—like you can strip country code and area code in phone numbers that have the same country and area code).

4.3 Deduction Rules

The above mentioned rules typically are made up of a condition part and an action part. The condition part may be expressed as an Boolean predicate combining some of the user characteristics and/or some of the message characteristics. If the condition part evaluates to true, the action part will be fired. The action part of a deduction rule finally assigns a particular role to a message.

In the most simple case the proposed method suggests to search for occurrences of the user's identity key, user-specific attribute strings available in the system (like mail-userid U, full name N and nickname NN) and restricts itself to match only strings in certain fields with strict semantics (e.g. in a mail system, it may look only for occurrences of U, only in the fields "To:" and "cc:" and "bcc:").

Preferably however, the computer system uses all information in the message/document, conventions, heuristics, and user preferences for distinguishing documents with immediate actions required for the individual user from documents without immediate actions required.

The following deduction rules have been proven to be quite successful:

a 1. deduction rule, which assigns a role of SINGLE-ADDRESSEE, if the user is the only addressee in the TO: field;

a 2. deduction rule, which assigns a role of MULTIPLE-ADDRESSEES, if the user is one of a multitude of addressees in the TO: field;

a 3. deduction rule, which assigns a role of SINGLE-CC-ADDRESSEE, if the user is the only addressee in the CC: field;

a 4. deduction rule, which assigns a role of MULTIPLE-CC-ADDRESSEES, if the user is one of a multitude of addressees in said CC: field;

a 5. deduction rule, which assigns a role of BCC-ADDRESSEE, if the user is an addressee in the BCC: field;

a 6. deduction rule, which assigns a role of DISTRIBUTION-LIST, if the user is a member of a distribution list in the TO: field.

The advantage of above mentioned rules is that the condition part is having a low complexity only. Of course more complex condition parts are possible. The example deduction rules given below actually represent heuristics for discovering wrong use of conventions with respect to messages. Since many users receive more and more electronic mail documents than they can afford to read carefully, more and more mails are discarded without being opened. Thus, in anticipation of such an attitude some senders "oversell" their mail documents (i.e. they try to make the mails seem more attractive than they are) in order to improve the odds that the addressee(s) read their mail document which would be discarded unread without overselling.

Some successful deduction rule examples of a more complex structure are the following:

a 7. deduction rule, which assigns a role of DISTRIBUTION-LIST, if the user is the only or one of a multitude of addressees in the TO: field but the message does not contain a salutation with the user's name or nickname;

This deduction rule is targeted at situations of overselling messages by generating mass mail (spam) with personalized address field (To field). The selectivity of this rule can further be enhanced if a search for the user's name and/or nickname in the message body is performed; if no such name can be found within the body of the message a role of DISTRIBUTION-LIST is assigned.

a 8. deduction rule, which assigns a role of DISTRIBUTION-LIST, if the user is the only or one of a multitude of addressees in the TO: field and if the message comprises a footer and the footer does not comprise information referring to a person or entity the user has an established business relationship with.

Also this deduction rule is targeted at situations of overselling messages by generating mass mail similar to the preceding rule. To determine an existing business relationship the electronic address book of that user could be analyzed and established business relationship could be made part of that user's characteristics.

a 9. deduction rule, which assigns a role of SINGLE-ADDRESSEE or a role of MULTIPLE-ADDRESSEES respectively, if the user is the only one or one of a multitude of addressees respectively in the CC: field but the message comprises a salutation with the user's name or nickname.

This deduction rule is targeted at cases of abuse where a first user receives a reply from a second user whereby the first user has been an addressee on the CC: list of that message only, and the second user created the reply message without moving the first user from CC: field to the TO: field. Although this violates the conventions implied by the messaging system, above mentioned deduction rule is capable of detecting exactly that case, namely: the sender expects a response from the actual user although the actual user is only on the CC: field (list of secondary addressees).

4.4 Optional Technology Enhancements

The features given below represent optional enhancements which can be combined with the technology outlined so far for achieving further advantages.

1. Data/Text mining technologies can be applied within the step of analyzing a certain message for revealing role related data which then can be made part of the message characteristics.

2. According to the current invention the proposed methodology may be executed by a messaging system at different points in time. The following execution points are suggested:

for each new arriving message; or at repeating time intervals for messages for which no role has been assigned yet; or when a message is opened.

These points in time for execution of the methodology are ordered in sequence of decreasing resources consumptions as well as decreasing responsiveness.

3. To allow a user to reproduce and to understand why a certain message has been associated with a particular role it is beneficial to visually emphasise those message characteristics which have been exploited by that particular deduction rule which finally assigned said role. Visual emphasis can be achieved by typical display attributes like: using special fonts or sizes, color, bold, italics, underline attributes, blinking and so forth.

4. The handling of the message lists for a particular user can be improved further if the messages are ordered in groups whereby each group comprises messages associated with the same role (either with or without rendering the assigned role). Further advantages may be achieved if any available prioritization technology is exploited and in addition to the role messages are associated with also a priority number is computed and assigned to the messages. The messages within a group of messages belonging to the same role can then be ordered according to their priority number.

5. Most messaging systems offer macro capabilities or capabilities to enhance the system with so-called "agents". If the current invention is implemented with one of these techniques access to the data for determining user characteristics and message characteristics is readily available (for instance through APIs of the messaging system). This simplifies implementation of the proposed invention significantly.

6. With an increasing number of deduction rules the selectivity and power of the deduction rule system will be improved. On the other hand this increases the probability that more than one deduction rule maybe applied for a certain instance, thus introducing the problem of rule conflicts. For their resolution the current invention suggests that a precedence scheme is predefined for the set of deduction rules. This precedence scheme defines which deduction rule takes precedence over which other deduction rules; it thus may be regarded as priority sequence for deduction rules. One possibility is to interpret the sequence of the deduction rules as they are occurring within the set of deduction rules as this precedence scheme.

4.5 Summarizing Overview

FIG. 1 represents an summarizing overview on the method as proposed by the current invention.

Step 100 indicates the beginning of the proposed methodology. Step 101 is dedicated to the determination of the user characteristics of the particular user; in one embodiment of the current invention this could mean to determine the user's userid his/her (full or partial) user name or even the nickname. Within the next step 102 a particular message is analyzed to determine that particular message's characteristics. For the embodiment of the current invention within an e-mail oriented messaging system this could mean to determine the contents of the TO:, CC: or BCC: message fields, the body of the message, the salutation and/or the footer within the message or similar types of data. Step 103 comprises the application of one or a multitude of deduction rules, wherein based on the user characteristics (determined within step 101) and based on the message characteristics (determined within step 102) said user's role is determined and assigned to that message. This role is capable of revealing said user's relationship to the message. Finally within step 104 the determined role is rendered and thus visualized to the user. Repeating the proposed methodology along path 105 would mean to execute the rendering activities in a single step 104 for all assigned roles; while alternatively it is possible to perform the rendering for each individual assigned role and start repetition of the methodology once this has been completed along path 106.

Figure 2:
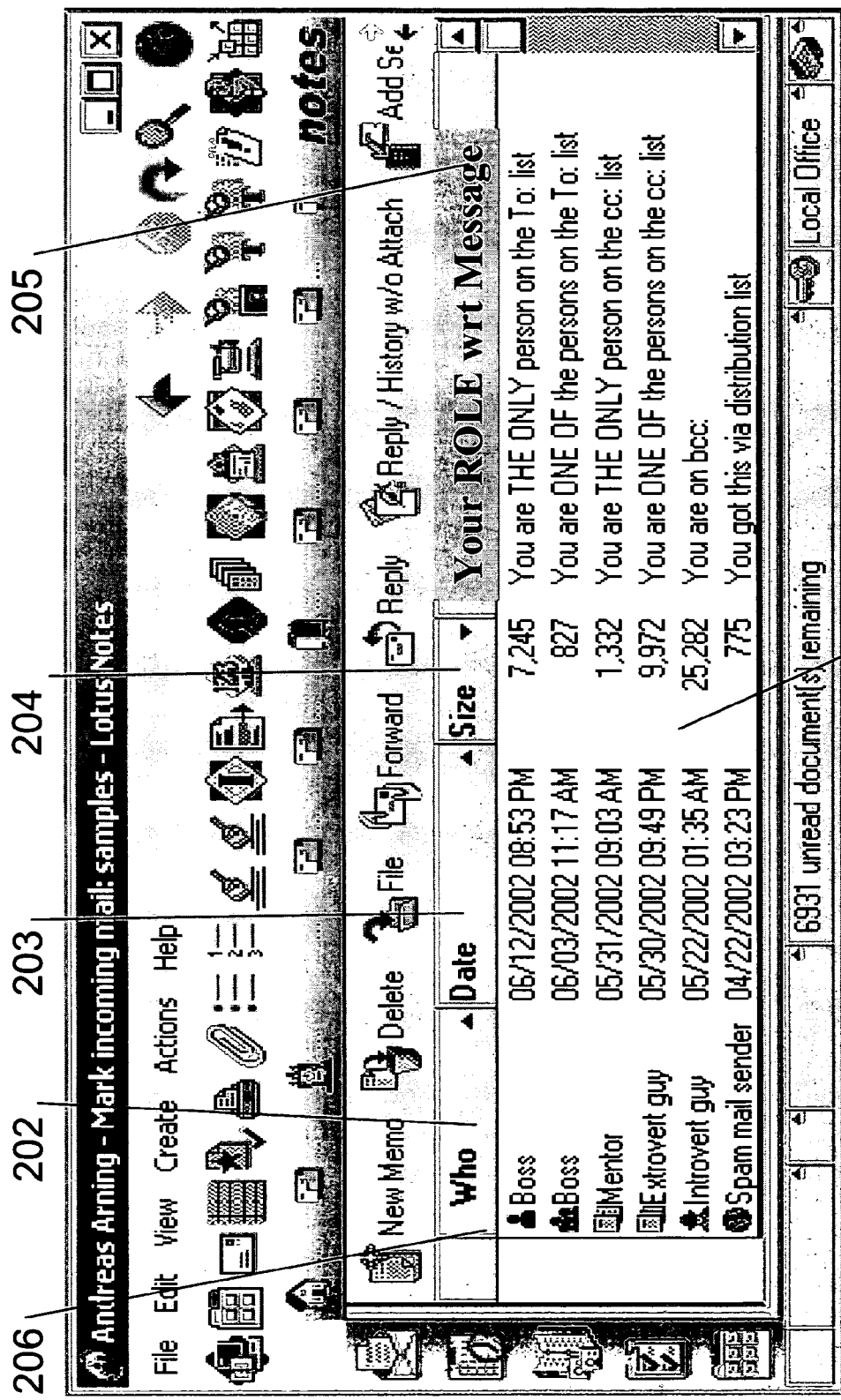
FIG. 2 depicts an example list of messages sent to a certain user also rendering visualizations the roles of that user assigned to the particular messages according to the technology of the current invention.

More details on the rendering process is given by FIG. 2. FIG. 2 depicts a list 201 messages sent to a certain user. Besides showing the sender's name of the individual messages in column 202, in column 203 the date a message has been sent, the message size in column 204 two different mechanisms to visualizes the assigned roles are also reflected. A first type of visualization is given in column 205. This field contains a short textual explanation of the assigned role. As an example the individual roles are indicated by the following text strings:

| ROLE | describing text string |
|---|---|
| SINGLE-ADDRESSEE | "You are THE ONLY person on the TO: list" |
| MULTIPLE-ADDRESSEES | "You are ONE OF the persons on the TO: list" |
| SINGLE-CC-ADDRESSEE | "You are THE ONLY person on the CC: list" |
| MULTIPLE-CC-ADDRESSEES | "You are ONE OF the persons on the CC: list" |
| BCC-ADDRESSEE | "You are on BCC:" |

-continued

| ROLE | describing text string |
|---|---|
| DISTRIBUTION-LIST | "You got this via distribution list" |

A second type of visualization is given in column 206. According to this second approach for each of the assigned roles a different icon is visualized.

As already pointed out above the most important advantage of the current invention by being able to derive a recipient's role with respect to a certain message consists in saving a lot of working time for the recipient. The recipient's role with respect to a certain message made available to the user automatically eliminates the necessity of the recipient to manually inspect the message for deciding what to do with that message. A further advantage is the recipient's role with respect to a certain message most clearly expresses the sender's expectation how that recipient has to handle a message (from the sender's perspective).

When a sender sends an electronic message document to one or more addressees, there are certain expectations what the addressees should do with the mail. In most cases the addressees are expected to perform one or more of the following activities:

Take notice of the mail (thus it being of a "for your information only" character)

Open the mail and read it

Do some action described in the mail

Send a reply mail back to the sender

If the mail was marked "urgent", handle mail with special priority

Even assuming for a moment that all addressees would have enough time so each addressee could perform each of these activities for each mail document, this usually is not even desired by the sender. In other words, different addressees of one mail document will usually only perform a subset of these activities. This will depend on the concrete topic of the mail document as well as on the job description of the involved users. In other words, it depends on the recipient's role (i.e. the recipient's relationship) to said mail document to understand what the sender's expectations are. If the recipient's role can be a derived automatically then also the sender's expectations on the recipient have been revealed.

The following table gives a rule of thumb how the expectations of the sender can be derived from the attributes present in a mail document which led to a certain role assignment, based on the conventions implied by a typical electronic mail system. The leftmost column indicates the role, mainly defined by the fact in which field of the mail document the userid of the current user can be found, and whether it is the only content of the field or just one of two or more userids.

| Expectations-> Role: | Take notice | Read | Action Required | Reply required | Respect "Urgent" Flag |
|---|---|---|---|---|---|
| only user in To field (SINGLE-ADDRESSEE) | Y | y | Maybe | y | y |
| one of users in To field (MULTIPLE-ADDRESSEES) | Y | y | Maybe | maybe | y |

-continued

| Expectations-> Role: | Take notice | Read | Action Required | Reply required | Respect "Urgent" Flag |
|---|---|---|---|---|---|
| in distribution list in To field (DISTRIBUTION-LIST) | maybe | maybe | Maybe | maybe | y |
| only user in cc field (SINGLE-CC-ADDRESSEE) | Y | maybe | Maybe | n | maybe |
| one of users in cc field (MULTIPLE-CC-ADDRESSEES) | Y | maybe | N | n | maybe |
| user in bcc field (BCC-ADDRESSEE) | Y | maybe | Maybe | n | maybe |

The different roles imply quite different expectations; thus, it seems plausible that automatically deriving and displaying the role as important feature of the mail promises benefits.

In above table, there are several table elements that have the value "maybe"; this means to compute these values automatically from mail attributes more enhanced technologies are required. These expectations do depend on sender's and addressee's context, job description etc. For their automatic derivation more enhanced technologies like those of text mining and/or data mining have to be exploited: using these technologies enhanced user characteristics and/or enhanced message characteristics can be determined which then will allow the set of deduction rules to assign roles of the recipient to the individual messages which even closer match the sender's expectations.

When sorting mail documents by role, it is evident that the sort order will slightly depend on the weight one puts on the different expectations. If possible, the enduser should be able to take influence, for example to specify how documents received in the bcc role should rank in comparison to other roles.

While the current invention to a certain extent has been described based on an e-mail system, this has to be understood as an example only. Actually the proposed teaching may be by applied to all systems which exchange messages, or in other words to messaging systems in general. Other variants of messaging systems (also comprising the concept of addressees) to which the current teaching beneficially may be applied to are:

1. task planning tools Task planning planning tools very often also support the possibility to the send task items to various participants.
2. SMS messages between mobile phones
3. etc.

The invention claimed is:

1. A computerized method for improved handling of messages directed to a user of an electronic messaging system, said method comprising: determining user characteristics, wherein said user characteristics comprise all of the following elements: a user ID of said user in said messaging system; a name of said user; a nickname of said user, capable of identifying said user as addressee of a message; analyzing a certain message and determining message characteristics, wherein said message characteristics comprise all of the following elements: a contents of a TO: field; a contents of a CC: field, identifying addressees receiving a complimentary copy; a contents of a BCC: field, identifying addressees receiving a blind carbon copy; the a contents of the a body of said message, of said certain message, from one or a multitude of message fields; selectively applying at least one deduction rule of a potential set of deduction rules, wherein said set of deduction rules comprises all the following deduction rules: a first deduction rule, which assigns a role of SINGLE-ADDRESSEE, if said user is the only addressee in said TO: field; a second deduction rule, which assigns a role of MULTIPLE-ADDRESSEES, if said user is one of a multitude of addressees in said TO: field; a third deduction rule, which assigns a role of SINGLE-CC-ADDRESSEE, if said user is the only addressee in said CC: field; a fourth deduction rule, which assigns a role of MULTIPLE-CC-ADDRESSEES, if said user is one of a multitude of addressees in said CC: field; a fifth deduction rule, which assigns a role of BCC-ADDRESSEE, if said user is an addressee in said BCC: field; a sixth deduction rule, which assigns a role of DISTRIBUTION-LIST, if said user is a member of a distribution list in said TO: field, a seventh deduction rule, which assigns a role of DISTRIBUTION-LIST, if said user is the only or one of a multitude of addressees in said TO: field but said message does not contain a salutation with said user's name or nickname; an eighth deduction rule, which assigns a role of DISTRIBUTION-LIST, if said user is the only or one of a multitude of addressees in said TO: field and if said message comprises a footer and said footer does not comprise information referring to a person or entity said user has an established relationship with; a ninth deduction rule, which assigns a role of SINGLE-ADDRESSEE or a role of MULTIPLE-ADDRESSEES respectively, if said user is the only one or one of a multitude of addressees respectively in said CC: field but said message comprises a salutation with said user's name or nickname, based on said user characteristics and said message characteristics, to said certain message; and responsive to selectively applying at least one deduction rule, said at least one deduction rule identifying a role of said user and assigning said role to said certain message, said role revealing a relationship of said user to said certain message.

2. The computerized method for improved handling of messages according to claim 1, wherein in a message list comprising said message and other messages directed to said user, said role assigned to said message is indicated visually.

3. The computerized method for improved handling of messages according to claim 2, wherein said indication is one of the following: an icon uniquely indicating said role; a textual indication of said role, and a combination of the icon uniquely indicating said role and the textual indication of said role.

4. The computerized method for improved handling of messages according to claim 2, wherein said message list is organized in groups of messages to which a same role has been assigned.

5. The computerized method for improved handling of messages according to claim 4, wherein within each of said groups messages are organized according to any prioritization technology.

6. The computerized method for improved handling of messages according to claim 1, wherein, when said message is opened, said message characteristics contributing to said assigned role are visually emphasized.

7. The computerized method for improved handling of messages according to claim 1, wherein, said third step is performed for each new arriving message; or when a message is opened; or at repeating time intervals for messages for which no role has been assigned yet.

8. The computerized method for improved handling of messages according to claim 1, wherein, said user characteristics and message characteristics are determined by application of data mining technology.

9. The computerized method for improved handling of messages according to claim 1, wherein, if multiple of said deduction rules are applicable, a predefined precedence scheme defines which of said applicable deduction rules finally succeeds.

10. The computerized method for improved handling of messages according to claim 1, wherein said messaging system is an e-mail system and said messages are e-mails.

11. A computer system comprising means adapted for carrying out the steps of the method according to claim 1.

* * * * *